United States Patent [19]
Pachynski, Jr.

[11] 3,860,769
[45] Jan. 14, 1975

[54] METHOD AND APPARATUS FOR TESTING THE OPERATION OF A COMMUNICATION SYSTEM

[75] Inventor: Alvin L. Pachynski, Jr., Redwood City, Calif.

[73] Assignee: GTE Lenkurt Incorporated, San Carlos, Calif.

[22] Filed: Nov. 1, 1972

[21] Appl. No.: 302,975

[52] U.S. Cl. .......... 179/175.3 R
[51] Int. Cl. .......... H04b 3/46
[58] Field of Search .......... 179/175.3 R, 175.31 R, 179/18 AF; 333/11

[56] References Cited

UNITED STATES PATENTS

| | | | |
|---|---|---|---|
| 2,302,374 | 11/1942 | Mitchell | 179/175.3 |
| 2,326,081 | 8/1943 | Van Wynen | 179/175.3 |
| 2,666,099 | 1/1954 | Bonner | 179/175.3 |
| 3,636,280 | 1/1972 | Wetzel | 179/175.3 |

OTHER PUBLICATIONS

Telephone Communication by Wright, 1925, pp. 244 to 248.
Glossary of Communications by Emerson Smith, July, 1971.

*Primary Examiner*—Kathleen H. Claffy
*Assistant Examiner*—Douglas W. Olms
*Attorney, Agent, or Firm*—Leonard R. Cool; Russell A. Cannon; T. C. Jay, Jr.

[57] ABSTRACT

A carrier loop comprises first and second carrier channels coupling signals in opposite directions and having at each end thereof a hybrid with one pair of opposing ports connected to the adjacent ends of associated channels. A balancing network is connected to a port of the other pair of opposing ports of one hybrid. A first relay adjacent the one hybrid has a pair of normally open contacts connected across the balancing network and has pairs of normally closed contacts connected in series with associated terminals of the other output port of the other pair of opposing ports of the one hybrid. A second relay adjacent the other hybrid has pairs of normally open contacts connecting a test signal source to associated terminals of one port of the other pair of opposing ports of the other hybrid, and has pairs of normally open contacts connecting an impedance network and a meter to one port of the one pair of ports of the other hybrid and to the associated end of the second channel, respectively, that is normally connected to this one port. The operation of the loop is tested by energizing the second relay to connect the test signal source and impedance network to associated ports of the other hybrid and the meter to the end of the second channel, and by transmitting a control signal over an associated test channel to energize the first relay to short-circuit the balancing network and open-circuit the output port of the one hybrid to produce 0 dB return loss in the latter. This causes the test signal that is coupled through the other hybrid to be transmitted on the first carrier channel and coupled through the one hybrid, onto the second carrier channel. The returned test signal on the second channel is applied to the meter to provide a measure of the operativeness of the carrier loop.

20 Claims, 2 Drawing Figures

METHOD AND APPARATUS FOR TESTING THE OPERATION OF A COMMUNICATION SYSTEM

BACKGROUND OF INVENTION

This invention relates to transmission measuring systems, and more particularly to a system for testing the operation of a bidirectional telephone communication system comprising a pair of communication channels having hybrid circuits connected between adjacent ends thereof.

In conventional telephone systems, a subscriber two-way loop includes a subscriber station that is connected to a telephone central office through a pair of adjacent unidirectional carrier or PCM multiplex channels having four-port hybrids connected across opposite ends thereof. Telephone central offices are also interconnected by similar networks. In order to insure quality telephone service for subscribers, it is necessary to periodically test telephone circuits to see that they are operating satisfactorily. One method of testing such a subscriber two-way loop is to locate test personnel at both ends of the loop and perform end-to-end testing on the channels. This technique is obviously expensive since it requires people at both ends of the channels. The test method is also time consuming when it is necessary to check a loop having one end in an unattended location that is relatively inaccessible. An alternate approach is to locate, at the unattended end of the loop, a bridging network that is external to the loop and a remotely controlled sensor. The sensor, upon command from the attended location, connects one channel of the loop back through the external bridging network and an auxiliary channel to the attended location. The one channel of the loop can then be tested by transmitting a test signal down it and measuring the return signal at the end of the auxiliary channel in the attended office. Disadvantages of this method are that it does not test all components of the loop; it requires the use of an auxiliary channel; and it requires multiple testing to check both channels of the subscriber loop.

An object of this invention is the provision of improved and simplified apparatus and method for testing the operation of a bidirectional communication system from a single location.

SUMMARY OF INVENTION

Briefly, the operation of a pair of unidirectional communication channels forming bidirectional transmission paths between a pair of four-port hybrids is tested by selectively varying the value of the return loss of one hybrid for coupling an applied signal on one channel, through the one hybrid and onto the other channel back toward the other hybrid where the returned signal is measured to produce an indication of the operativeness of the transmission system.

BRIEF DESCRIPTION OF DRAWING

This invention will be more fully understood from the following detailed description thereof, together with the following drawing in which.

DESCRIPTION OF PREFERRED EMBODIMENTS

Figures 1, 2:
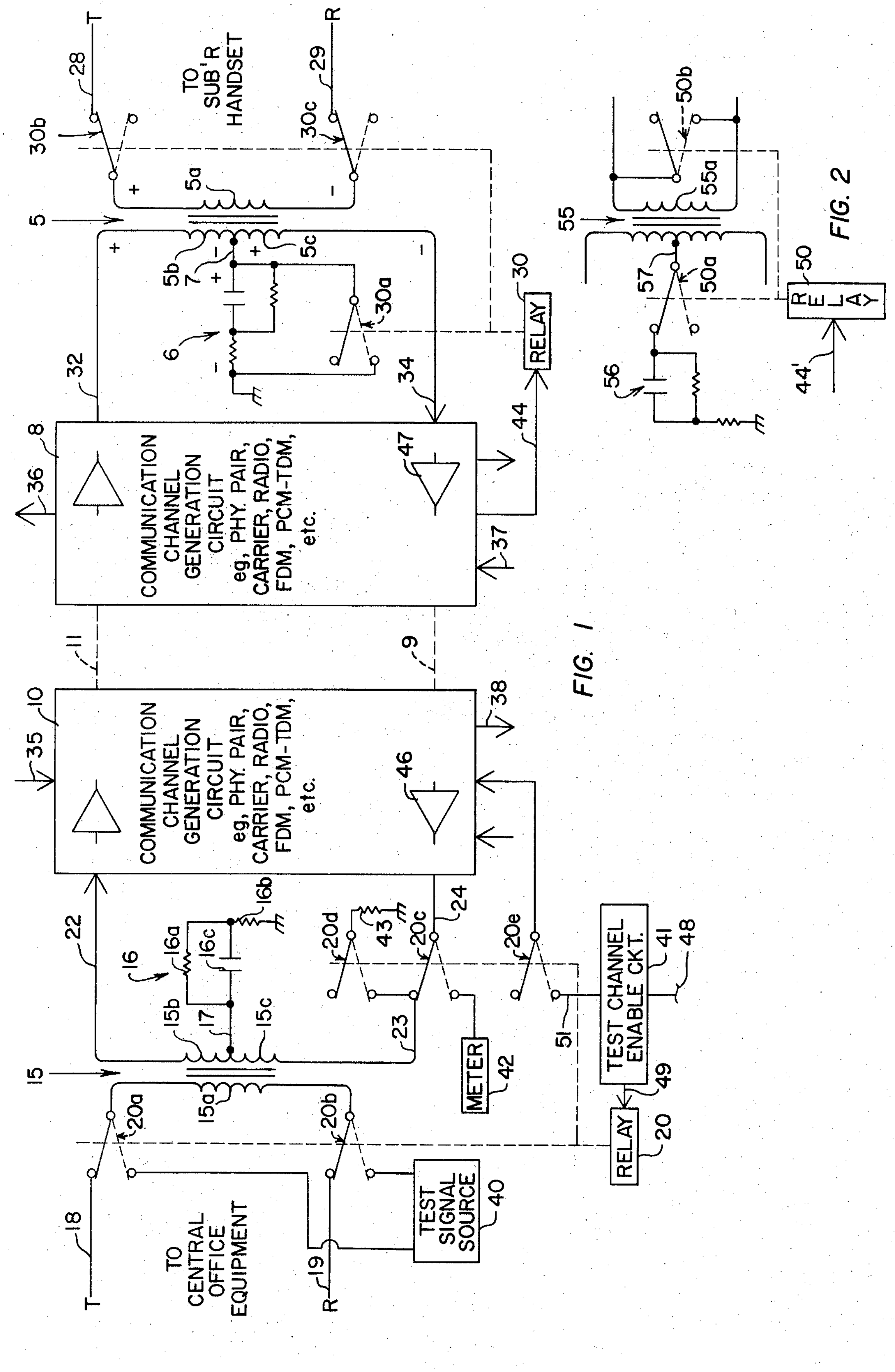
FIG. 1 is a schematic block and circuit diagram of a system embodying this invention.
FIG. 2 is a schematic block and circuit diagram illustrating an alternate connection of a hybrid circuit in accordance with this invention.

In the preferred embodiment of this invention illustrated in FIG. 1, a subscriber handset (not shown) is connected through a first differential hybrid circuit 5, communication channel generation circuits 8 and 10, and a second differential hybrid circuit 15 to central office equipment (not shown). Each of the hybrids is essentially a four-port network. Since the two hybrid circuits 5 and 15 are similar, only the hybrid 15 will be described in detail.

The differential hybrid 15 comprises a primary winding **15*a* and a center-tapped secondary defining windings 15*b* and 15*c*. An impedance network 16 comprising resistors 16*a* and 16*b* and capacitor 16*c* is connected between the center tap 17 of hybrid 15 and ground. The winding 15*a* and center tap 17 comprise one pair of opposing ports of hybrid 15. The value of the impedance of network 16 is selected to balance the impedance connected across the winding 15*a*. The windings 15*b* and 15*c* comprise the other pair of opposing ports of hybrid 15**.

During normal non-test operation, the tip and ring leads 18 and 19 from the central office are connected through contacts **20*a* and 20*b*, respectively, of a relay 20 to the terminals of winding 15*a*. The line 22 from winding 15*b* is connected to the input of circuit 10. The line 23 from winding 15*c* is connected through normally closed contacts 20*c* of relay 20 to the output line 24 of circuit 10**.

Similarly, the tip and ring leads 28 and 29 are connected through contacts **30*b* and 30*c*, respectively, of a relay 30 to terminals of winding 5*a*. The lines 32 and 34 from the windings 5*b* and 5*c* are connected to the output and input, respectively, of circuit 8**.

The tip and ring lead terminals of hybrids 5 and 15 pass voice-frequency signals to and from circuits 8 and 10, respectively. The circuits 8 and 10 channelize the voice-frequency signals for transmission between the hybrids. The circuits 8 and 10 may, by way of example, comprise a pulse-code modulation (PCM) system of the type described in the article, "Second-Generation Toll-Quality PCM Carrier Terminal" by L. Deane Crawforth, GTE Automatic Electric Technical Journal, April 1972, volume 13, no. 2. In such a system, a voice signal from the central office on lines 18, 19 is translated by circuit 10 into PCM words that are transmitted over a circuit 11, which may for example be a cable pair, to circuit 8. The PCM words are converted back to a voice signal by circuit 8 and are applied to hybrid 5. In a similar manner, the circuits 8 and 10 channelize subscriber voice signals on lines 28, 29 for transmission over cable pair 9 and thus to the central office.

Thus, circuits 8 and 10 and interconnecting cable 11 comprise one unidirectional channel from hybrid 15 to hybrid 5. Similarly, the circuits 8 and 10 and the interconnecting cable 9 comprise another unidirectional channel from hybrid 5 back to hybrid 15. These two unidirectional channels comprise a bidirectional communication system. A channel is basically the smallest subdivision of a circuit by means of which a single type of communication service is produced wherein communication may be defined as transmitting and/or receiving information, signals, or messages.

Alternatively, the circuits 8 and 10 may comprise a conventional radio frequency carrier system, transmitting carrier signals therebetween on coaxial cables or by radio. In a multiplex system, signals to and from other channelizing circuits (not shown) may be connected on associated lines 35 – 38 to and from the circuits 8, 10.

The system described thus far is conventional, except for the relays 20 and 30 and the contacts thereof.

It is desirable during normal operation of the telephone system in FIG. 1 that the hybrids 5 and 15 have a return loss that is as large as possible. The return loss of hybrid 5 is defined as the signal loss between the receive and transmit terminals 32 and 34 of hybrid 5. This loss is caused by mismatch between the balancing network 6 and the lines 28, 29. If the lines 28, 29 and balancing network 6 are perfectly matched, the return loss of hybrid 5 will be infinite and no transmission will exist across hybrid 5, i.e., between lines 32 and 34. If all of the impedances connected to the ports of the hybrid are balanced, it is possible to obtain a return loss of 50 dB. Since perfect balance cannot be obtained over a broad frequency band, however, typical values of return loss are between 30 and 35 dB.

In accordance with this invention, the return loss of hybrid 5 is selectively varied to couple a test signal through hybrid windings 15*a* and 15*b*, circuit 10, cable 11, circuit 8, line 32 through hybrid windings 5*b* and 5*c*, and the other communication channel to the output line 24 where it is measured to test the operation of the bidirectional communication system. Apparatus for testing the operation of this system in FIG. 1 comprises test signal source 40, test channel enable circuit 41, meter 42, and the relay 20 which are preferably located proximate the hybrid 15 in the central office, and the relay 30 which is located adjacent the subscriber hybrid 5. All of the contacts of the relays in FIGS. 1 and 2 are shown in the de-energized position which is associated with the normal non-test operation of the system. Source 40 is connected to the normally open-circuited terminals of contacts 20*a* and 20*b* of relay 20. Meter 42 is connected to the central office-output line 24 of circuit 10 through the normally open contacts 20*c*. An impedance network 43 is connected through the normally open contacts 20*d* to line 23 to terminate the associated port of hybrid 15 in its characteristic impedance when relay 20 is energized and meter 42 is connected to line 24.

In a preferred embodiment of this invention, the return loss of hybrid 5 is varied by simultaneously short-circuiting the balancing network 6 and open-circuiting the winding 5*a*. This is accomplished by connecting the normally open contacts 30*a* of relay 30 across balancing network 6 and disconnecting the winding 5*a* from the subscriber handset by opening the normally closed contacts 30*b* and 30*c* of relay 30. The relay 30 is selectively energized by a control signal from circuit 41 in the central office. The control signal is transmitted to relay 30 through the normally open contacts 20*e* of relay 20, a control signal channel comprising circuits 8 and 10 and the interconnecting cable 9, and the output line 44 of circuit 8.

In the normal non-test operation, the contacts of the relays are in the positions shown by solid lines in the figures. A voice signal from the central office, for example, is applied to primary winding 15*a* and produces equal signals in secondary windings 15*b* and 15*c*. The signal in winding 15*c* is dissipated in the output circuit of amplifier 46. The signal in winding 15*b*, however, is translated to a corresponding carrier signal by channelizing circuit 10, is transmitted on cable 11, and is translated back to a voice signal by the other channelizing circuit 8. A voice signal voltage V on line 32 divides equally across the hybrid winding 5*b*, and the network 6 in the polarities shown. A signal of the same magnitude V/2 and of the polarity shown is also developed across the winding 5*c*. Since the two signal voltages V/2 between the input to amplifier 47 and ground (across the winding 5*c* and network 6) are of opposite polarities, they cancel. A signal is therefore not transmitted back toward the hybrid 15 in the central office. An output signal voltage is developed across the winding 5*a* and coupled to the subscriber handset.

The communication system is tested by activating a push-button 48, for example, to enable circuit 41. The output of the test circuit 41 on line 49 energizes relay 20 to switch the contacts 20*a* – 20*e* thereof to the positions shown by dashed lines. Thus, source 40 is connected to apply a test signal to winding 15*a*, meter 42 is connected to the output line 24 of circuit 10, the winding 15*c* is terminated in its characteristic impedance by network 43, and the other output line 51 of circuit 41 is connected to channelizing circuit 10. The control signal on line 51 is transmitted via its own carrier channel through circuits 8 and 10 and cable 9 to energize relay 30 to switch the contacts 30*a* – 30*c* thereof to the positions shown by dashed lines. This open-circuits winding 5*a*, short-circuits balancing network 6 so as to ground the center tap 7, and essentially converts hybrid 5 into an auto-transformer. This causes substantially 0 dB return loss in hybrid 5 so that substantially all of an applied signal on line 32 is coupled back through this hybrid to the output terminal 24 of circuit 10.

Briefly, the test signal from source 40 is coupled through the windings 15*a* and 15*b* of hybrid 15 and the first communication channel to line 32. A signal voltage V on line 32 produces signals of equal amplitude and the polarity shows in the windings 5*b* and 5*c*. No signal is developed across the balancing network 6, however, which is short-circuited. Since the magnitude of the voltage between the input to amplifier 47 and ground is now approximately equal to that on line 32, substantially all of the test signal is coupled back through the other channel (i.e., circuits 8 and 10 and the other cable 9) to meter 42. The indication on the meter is a measure of the quality of the operativeness of the hybrids and the communication channels therebetween.

In practice, the signal level indicated by meter 42 will be less than the level of the output signal of source 40 by the losses in the bidirectional communication system. In a system that was built and tested, the measured signal on line 24 was 4 dB down from the signal level produced by source 40. The signals can be adjusted to be any desired level that is greater than the noise level in the system and which does not overdrive individual circuits thereof.

An alternate embodiment of this invention is illustrated in FIG. 2 wherein the center tap 57 of a hybrid 55 is connected through normally closed contacts 50*a* of relay 50 to the balancing network 56, and the terminals of the winding 55*a* are interconnected through the normally open contacts 50*b* of this relay. Substantially 0 dB return loss is produced in hybrid 55 for testing the operation of the communication system by energizing relay 50 to simultaneously open-circuit balancing network 56 to disconnect it from hybrid 55, and to short-circuit the winding 55*a* thereof.

Although this invention is described in relation to a preferred embodiment thereof, variations and modifications will be apparent to those skilled in the art. For example, the system could be operated between central offices, or in most 4-wire to 2-wire or two-channel at one-channel systems operating between hybrids. Also, in a system having a plurality of bidirectional communication loops, coded amplifiers associated with relays 30, 50 could be used instead of using a separate channel for each of the latter. Further, although differential transformer hybrids are shown in the figures, composite or resistive hybrids could also be employed. Satisfactory testing operation may also be obtained with various degrees of imbalance of hybrid 5 other than those shown in the figures. Measurable results were obtained with the winding 5*a* or the balancing network 6 either short-circuited or open-circuited, while the other was terminated in its normal value of impedance. Also, the relay 20 and contacts thereof may be replaced by a mechanical switch.

What is claimed is:

1. In a method of testing the quality of transmission on a pair of unidirectional communication channels forming bidirectional transmission paths through a hybrid having a pair of ports connected to the pair of ends of associated channels, the improvement comprising the step of selectively varying the return loss of the hybrid to unbalance that hybrid for coupling an applied signal on one channel through the hybrid and onto the other channel for subsequent measurement.

2. The method according to claim 1 wherein said varying step comprises, the step of selectively producing substantially O dB return loss in the hybrid.

3. The method of testing the quality of operation of bidirectional transmission paths including first and second unidirectional communication channels passing signals in opposite directions and having at each end thereof a hybrid with first and second opposing ports that are connected to associated ends of the first and second channels, respectively, for coupling signals thereto and therefrom; comprising the step of selectively decreasing the return loss in one of the hybrids that is in a balanced condition to unbalance that hybrid for coupling a prescribed amount of a signal that is applied on the first channel to the first port of the one hybrid, through the one hybrid, and from the second port thereof, and onto the second channel toward the other hybrid for subsequent measurement.

4. The method according to claim 3 wherein the one hybrid has a balancing network terminating a third port thereof and said decreasing step comprises the step of short-circuiting the balancing network for unbalancing the one hybrid.

5. The method according to claim 3 wherein the one hybrid has a balancing network terminating a third port thereof and said decreasing step comprises the step of open-circuiting the connection of the balancing network to the third port of the one hybrid for unbalancing the latter.

6. The method according to claim 3, wherein the other hybrid includes a third port and including the additional steps of coupling a test signal to the third port of the other hybrid and thus onto the first channel, and measuring at a point on the second channel adjacent the other hybrid the return test signal that is coupled back through the opposing ports of the one hybrid to the other hybrid.

7. The method according to claim 6 including the additional steps of disconnecting the end of the second channel from the associated opposing second port of the other hybrid, terminating the associated opposing second port of the other hybrid in its characteristic impedance, and measuring the return test signal at the disconnected end of the second channel.

8. The method of testing the operation of bidirectional transmission paths including first and second unidirectional communication channels passing signals in opposite directions and having at each end thereof a hybrid with one pair of opposing ports that are each connected to one end of a different channel for coupling signals thereto and therefrom, one of the hybrids having a balancing network terminating a third port thereof; comprising the steps of coupling a test signal to a third port of the other hybrid and thus onto the first channel, disconnecting the end of the second channel from the associated opposing one port of the other hybrid, terminating the associated opposing one port of the other hybrid in the impedance that the one port is designed to operate into, short circuiting the balancing network for selectively varying the return loss in the one hybrid for coupling a prescribed amount of the test signal on the first channel to one of the associated opposing ports of the one hybrid, through the one hybrid and its other opposing port, and onto the second channel toward the other hybrid, and, measuring the return test signal at the disconnected end of the second channel.

9. The method according to claim 8 wherein the one hybrid has a fourth port opposing the third port thereof, and including the additional step of simultaneously short-circuiting the balancing network and open-circuiting the fourth port of the one hybrid.

10. In a bidirectional communication system including first and second unidirectional communication channels having at adjacent one ends thereof a four-port hybrid with first and second ports of one pair of opposing ports thereof connected to the one ends of associated first and second channels, and having a network connected to the third port of the other pair of opposing third and fourth ports of the hybrid, the network having a prescribed impedance level balancing the network with a line circuit connected to the fourth port of the hybrid and causing the latter to have a value of return loss for blocking a signal on the first channel from being coupled through the hybrid and onto the second channel; apparatus for testing the quality of operation of the system comprising a source of test signals, means for coupling a test signal onto the first channel, means for selectively varying the value of the return loss of the one hybrid to unbalance the latter for coupling a prescribed measurable portion of the test signal on the first channel through the hybrid and onto the second channel, and, means for measuring the level of the coupled test signal on the second channel for obtaining an indication of the quality of operation of the hybrid and the first and second channels of the communication system.

11. Apparatus according to claim 10 wherein said varying means is means for varying the degree of balance between the network and the line circuit that are connected to the third and fourth ports, respectively, of the hybrid.

12. Apparatus according to claim 11 wherein said coupling means couples a test signal to the fourth port of another hybrid having first and second opposing ports that are connected to associated other ends of the first and second communication channels.

13. Apparatus according to claim 12 wherein said measuring means measures the coupled test signal on the second channel at the end thereof adjacent the second port of the other hybrid.

14. In a bidirectional communication system including first and second unidirectional communication channels having at each end thereof a different four-port hybrid with first and second ports of one pair of opposing ports connected to the ends of associated first and second channels, and having a network connected to the third port of the other pair of opposing third and fourth ports of one hybrid, the network having a prescribed impedance level balancing the network with a line circuit connected to the fourth port of the one hybrid and causing the latter to have a value of return loss for blocking a signal on the first channel from being coupled through the one hybrid and onto the second channel; apparatus for testing the operation of the system comprising a source of test signals, means for coupling a test signal onto the first channel, means for selectively varying the value of the return loss of the one hybrid, and thus the degree of balance between the network and line circuit connected to the third and fourth ports, respectively, of the one hybrid, for coupling a prescribed measurable portion of the test signal on the first channel through the one hybrid and onto the second channel, said varying means comprising means for short-circuiting the balancing network, and means for measuring the level of the coupled test signal on the second channel.

15. In a bidirectional communication system including first and second unidirectional communication channels having at each end thereof a different four-port hybrid with first and second ports of one pair of opposing ports connected to the ends of associated first and second channels, and having a network connected to the third port of the other pair of opposing third and fourth ports of one hybrid, the network having a prescribed impedance level balancing the network with a line circuit connected to the fourth port of the one hybrid and causing the latter to have a value of return loss for blocking a signal on the first channel from being coupled through the one hybrid and onto the second channel; apparatus for testing the operation of the system comprising a source of test signals, means for coupling a test signal onto the first channel, means for selectively varying the value of the return loss of the one hybrid, and thus the degree of balance between the network and line circuit connected to the third and fourth ports, respectively, of the one hybrid, for coupling a prescribed measurable portion of the test signal on the first channel through the one hybrid and onto the second channel, said varying means comprising means for simultaneously short circuiting the balancing network and open-circuiting the connection of the fourth port of the one hybrid to the line circuit, and means for measuring the level of the coupled test signal on the second channel.

16. In a bidirectional communication system including first and second unidirectional communication channels having at each end thereof a different four-port hybrid with first and second ports of one pair of opposing ports connected to the ends of associated first and second channels, and having a network connected to the third port of the other pair of opposing third and fourth ports of one hybrid, the network having a prescribed impedance level balancing the network with a line circuit connected to the fourth port of the one hybrid and causing the latter to have a value of return loss for blocking a signal on the first channel from being coupled through the one hybrid and onto the second channel; apparatus for testing the operation of the system comprising a source of test signals, means for coupling a test signal onto the first channel, means for selectively varying the value of the return loss of the one hybrid, and thus the degree of balance between the network and line circuit connected to the third and fourth ports, respectively, of the one hybrid, for coupling a prescribed measurable portion of the test signal on the first channel through the one hybrid and onto the second channel, said varying means comprising means for simultaneously open-circuiting the connection of the balancing network to the third port of the hybrid and connecting a short circuit across the fourth port of the hybrid, and means for measuring the level of the coupled test signal on the second channel.

17. Apparatus according to claim 14 wherein the varying means includes a selectively actuated control signal source, a first relay having a normally open first pair of contacts connected in parallel with the balancing network, and a third communication channel connected in series between said first relay and said control signal source, said first relay being responsive to a control signal for closing said first contacts for short-circuiting the balancing network and producing substantially O dB return loss of in the one hybrid.

18. Apparatus according to claim 17 including a second impedance network, a second relay having a normally open first pair of contacts, means connecting associated ones of said first contacts of said second relay to the second port of the other hybrid and the second impedance network, said second network having an impedance value for terminating the second port of the other hybrid in its characteristic impedance when said second relay is energized to close said first contacts thereof, and wherein said measuring means is responsive to the control signal for disconnecting the one end of the second channel from the second port of the other hybrid for measuring the coupled test signal at the one open end of the second channel.

19. Apparatus according to claim 18 wherein said second relay has second and third pairs of normally open contacts associated with the fourth port of the other hybrid and said test signal source for selectively connecting the latter to, and selectively disconnecting any line circuit from, the fourth port in response to energization of said second relay.

20. Apparatus according to claim 19 including other contacts of said first relay open-circuiting the fourth port of said one hybrid when said first relay is energized.

* * * * *

UNITED STATES PATENT OFFICE
CERTIFICATE OF CORRECTION

Patent No. 3,860,769 Dated January 14, 1975

Inventor(s) Alvin L. Pachynski, Jr.

It is certified that error appears in the above-identified patent and that said Letters Patent are hereby corrected as shown below:

Column 8, claim 17, line 57, after "return loss" delete "of".

Signed and sealed this 15th day of April 1975.

(SEAL)
Attest:

RUTH C. MASON
Attesting Officer

C. MARSHALL DANN
Commissioner of Patents
and Trademarks

FORM PO-1050 (10-69)
USCOMM-DC 60376-P69
U.S. GOVERNMENT PRINTING OFFICE : 869-930